CIRCUIT INTERRUPTER

Filed Sept. 8, 1953 15 Sheets-Sheet 1

INVENTORS
ANTHONY VAN RYAN
KAZUO HENRY DATE
BY Arthur R. Woolfolk
Attorney

Aug. 27, 1957 A. VAN RYAN ET AL 2,804,521

CIRCUIT INTERRUPTER

Filed Sept. 8, 1953 15 Sheets-Sheet 2

INVENTORS
ANTHONY VANRYAN
KAZUO HENRY DATE

BY Arthur R. Woodcock
Attorney

CIRCUIT INTERRUPTER

INVENTORS
ANTHONY VAN RYAN
KAZUO HENRY DATE
BY Arthur R. Woolfolk
Attorney

Aug. 27, 1957 A. VAN RYAN ET AL 2,804,521

CIRCUIT INTERRUPTER

Filed Sept. 8, 1953 15 Sheets-Sheet 4

INVENTORS
ANTHONY VAN RYAN
KAZUO HENRY DATE
BY Arthur R. Woolfolk
Attorney

INVENTORS
ANTHONY VANRYAN
KAZUO HENRY DATE
BY Arthur R. Woolfolk
Attorney

INVENTORS
ANTHONY VANRYAN
KAZUO HENRY DATE
BY
Arthur R. Woolfolk
Attorney

INVENTORS
ANTHONY VAN RYAN
KAZUO HENRY DATE
BY
Arthur P. Woolfolk
Attorney

INVENTORS
ANTHONY VAN RYAN
KAZUO HENRY DATE
BY Arthur R. Woolfolk
Attorney

Aug. 27, 1957 A. VAN RYAN ET AL 2,804,521

CIRCUIT INTERRUPTER

Filed Sept. 8, 1953 15 Sheets-Sheet 9

INVENTORS
ANTHONY VAN RYAN
KAZUO HENRY DATE

BY Arthur R. Woolfolk
Attorney

INVENTORS
ANTHONY VAN RYAN
KAZUO HENRY DATE
BY
Arthur R. Woolfolk
Attorney

CIRCUIT INTERRUPTER

Filed Sept. 8, 1953 15 Sheets-Sheet 11

INVENTORS
ANTHONY VAN RYAN
KAZUO HENRY DATE
BY Arthur R. Woolfolk
Attorney

INVENTORS
ANTHONY VAN RYAN
KAZUO HENRY DATE
BY
Arthur R. Woolfolk
Attorney

INVENTORS
ANTHONY VAN RYAN
KAZUO HENRY DATE
BY
Arthur P. Woolfolk
Attorney

INVENTORS
ANTHONY VANRYAN
KAZUO HENRY DATE
BY Arthur R. Woolfolk
Attorney

Aug. 27, 1957 A. VAN RYAN ET AL 2,804,521

CIRCUIT INTERRUPTER

Filed Sept. 8, 1953 15 Sheets-Sheet 15

INVENTOR.
ANTHONY VAN RYAN
KAZUO HENRY DATE
BY Arthur R. Woolfolk
Attorney

United States Patent Office 2,804,521

Patented Aug. 27, 1957

2,804,521

CIRCUIT INTERRUPTER

Anthony Van Ryan and Kazuo Henry Date, South Milwaukee, Wis., assignors to McGraw-Edison Company, a corporation of Delaware Application September 8, 1953, Serial No. 379,046

14 Claims. (Cl. 200—98)

This invention relates to repeating polyphase circuit interrupters.

In polyphase circuit interrupters as heretofore constructed it has been the usual practice to provide a series coil for each phase and to so construct the series coils that they have sufficient power to operate the switches by their own power. As a result of this, the series coils have been relatively large and in addition to this have contributed greatly to the heating of the circuit interrupter under normal operation.

In other types of circuit interrupters it has been the practice to provide a series of relays responsive to overload which in turn close the circuit of either an intermediate relay or else of the electromagnet which actually executes the opening operation of the circuit interrupter. These relays are not wholly satisfactory and involve additional complications and adjustments.

This invention is designed to overcome the above noted defects and objects of this invention are to provide a polyphase circuit interrupter in which a series coil is provided for each phase but in which the series coils are relatively small and are not required to exert a sufficient pull to directly operate the several switches but instead which function merely as trip release coils, in which the series coils do not function as relays, in which the energy for opening the circuit interrupter is stored in a spring by means of a resetting electromagnet which is only energized a brief instant and is called upon for intermittent operation only and whose circuit is closed by means of an overcenter switch which is mechanically operated from the mechanism of the circuit interrupter immediately after opening of the circuit interrupter under normal conditions.

Further objects are to provide a polyphase circuit interrupter which is so made that operating means are provided and are arranged to have one or more quick circuit interrupting operations, followed if desired, by one or more slow circuit interrupting operations if the overload continues, and which therefore has two time current characteristics and may be coordinated with fuses in branch lines following the circuit interrupter.

Further objects are to provide a polyphase circuit interrupter which although provided with an operating unit in each of the phases, has, nevertheless, a single hydraulic means which coacts with each of the operating means or units and produces the two time current characteristics.

Further objects are to provide a polyphase circuit interrupter in which there is provided a single cumulative hydraulic means for causing automatic lockout of all of the phases of the circuit interrupter after a predetermined number of operations occurring in rapid succession and which is so arranged that if these operations occur at widely spaced intervals, means are provided for automatic resetting of the single cumulative means for its full number of subsequent operations.

Further objects are to provide a polyphase circuit interrupter in which although the overload may occur in a single phase, it nevertheless opens all of the phases simultaneously.

A further object of this invention is to provide a polyphase circuit interrupter which is power reset, that is to say in which a potential coil is provided which is sufficiently powerful to reset all of the switches and to store energy in a main switch-opening spring so that the series coils may be small and are only required to operate trip means to release the normally latched main spring or spring means to thereby allow quick opening of the circuit interrupter.

A specific detail of the invention is to construct the circuit interrupter so that the operating mechanism is automatically detached from the reset mechanism so that the opening spring does not have to overcome the inertia of the reset mechanism during opening stroke thus contributing to the rapidity of its opening stroke.

Further objects are to provide a polyphase circuit interrupter of the resetting, lockout type which may be externally adjusted by the operator so that it will be set for a single operation if so desired or which may be instantly changed from a single shot circuit interrupter to a multiple shot circuit interrupter by means of an external manipulating handle.

Further objects are to provide a circuit interrupter which although provided with three series tripping coils, nevertheless is provided with a single time delay means which is effective for controlling the operation due to energization of any of the series coils, and in which the time delay may be so set as to allow one or more fast operations followed by one or more delayed operations.

A further specific object of this invention is to provide a polyphase circuit interrupter in which the single time delay means is effective to control the operation due to the energization of any series coil, and in which the mechanism is so constructed that if two or more series coils are energized at the same time only the pull due to one series coil is effective.

A further object is to provide a time delay means which has an inverse relation to the magnitude of the overload and which is so constructed that if the overload increases the inverse relation is increased by the automatic adjustment of the time delay means.

Further objects are to provide a polyphase circuit interrupter which is automatically reset through the agency of a potential coil and in which an overcenter spring mechanism is provided to temporarily close the circuit of the reset potential coil whenever the circuit interrupter is automatically operated until lockout occurs at which time the switch controlling the potential coil is held in open position by the lockout means.

This invention is an improvement over, and has various differences from that disclosed in prior patent, No. 2,567,411 of September 11, 1951, for Polyphase Circuit Interrupter, issued to Anthony Van Ryan, one of the applicants herein, and assigned to the same assignee as the present application.

Embodiments of the invention are shown in the accompanying drawings in which.

Figure 11:
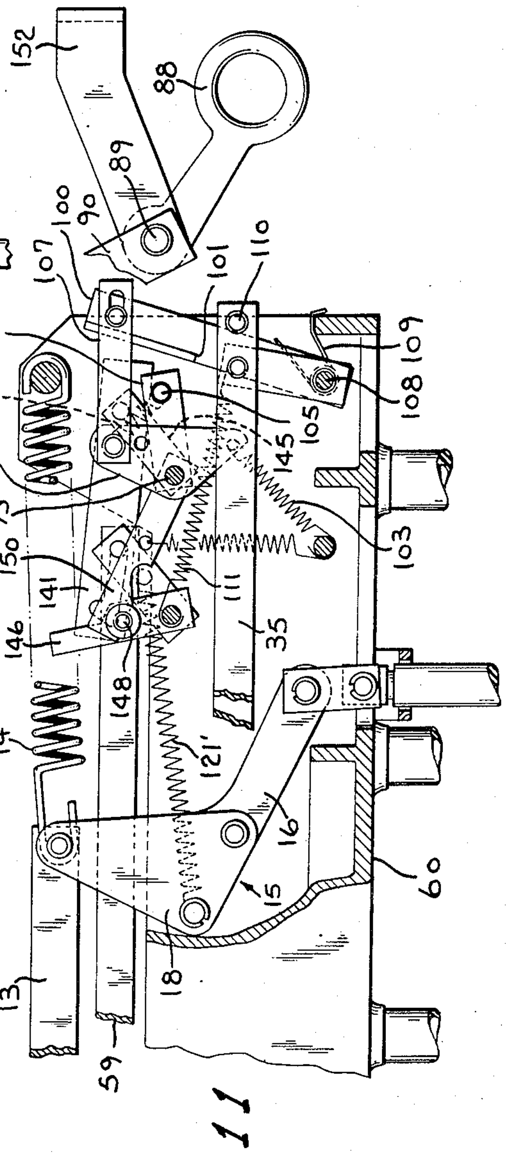
Figure 11 is a fragmentary view showing the front end of the power bar and the trip bar showing the parts in switch open position and showing the parts in lockout position.
Figures 12, 13, 14:
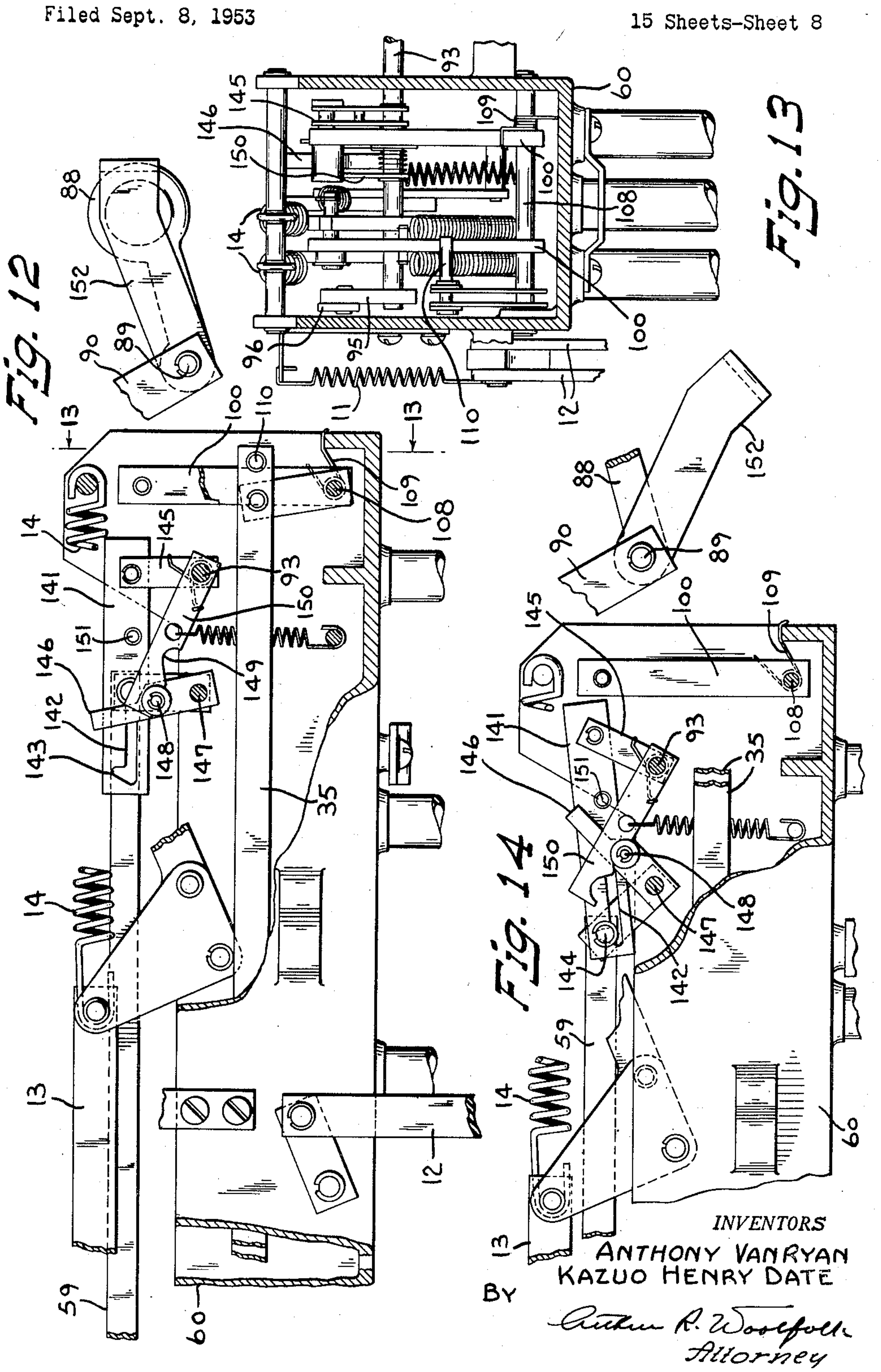

Figure 12 is a view corresponding to Figure 11 showing the parts in switch closed position. This view shows the circuit interrupter set for a multiple shot operation. This figure is not lockout position.

Figure 13 is a sectional view on the line 13—13 of Figure 12.

Figure 14 is a view corresponding to Figure 12 showing the parts as they appear when set for a one shot operation.

Figures 15, 17:
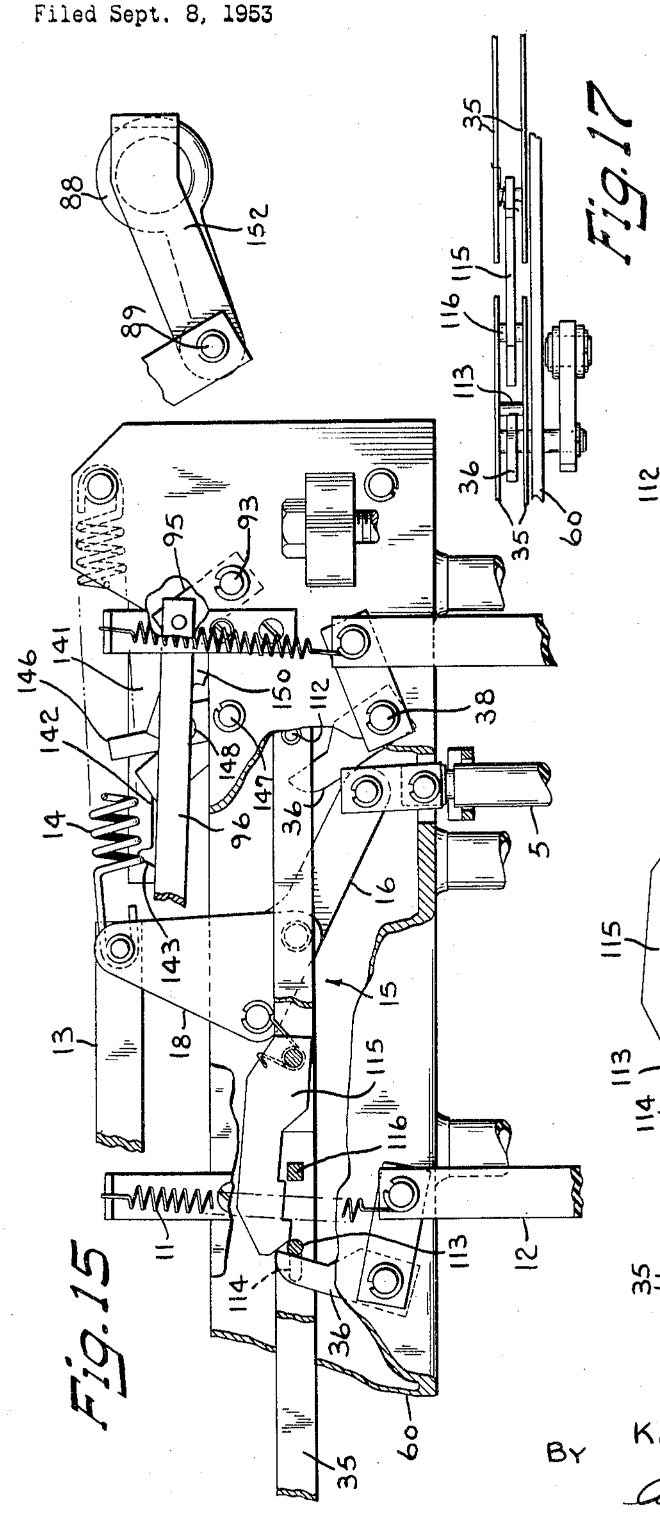

Figure 15 is a fragmentary view showing how the trip bar is interrupted or disconnected, thus separating it into segments which are temporarily mechanically independent due to the operation of a series coil.

Figure 16:
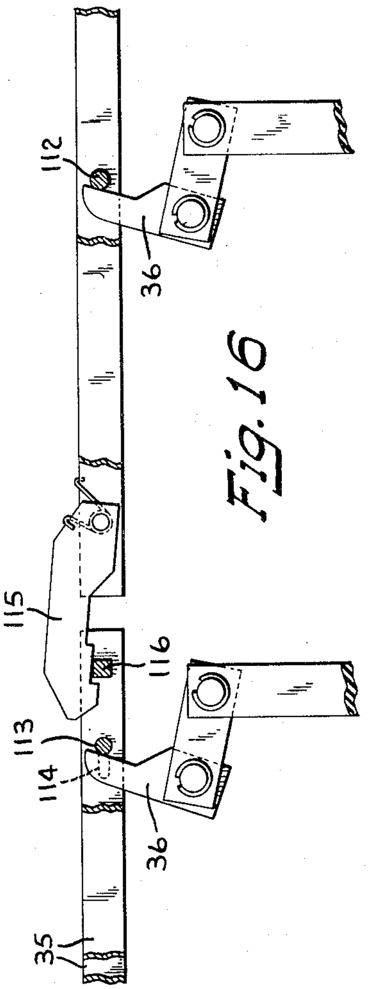

Figure 16 is a view showing how the trip bar is interrupted or sectionalized and the position of the parts when two of the series coils have been energized.

Figure 17 is a view looking down on a portion of the trip bar.

Figure 18:
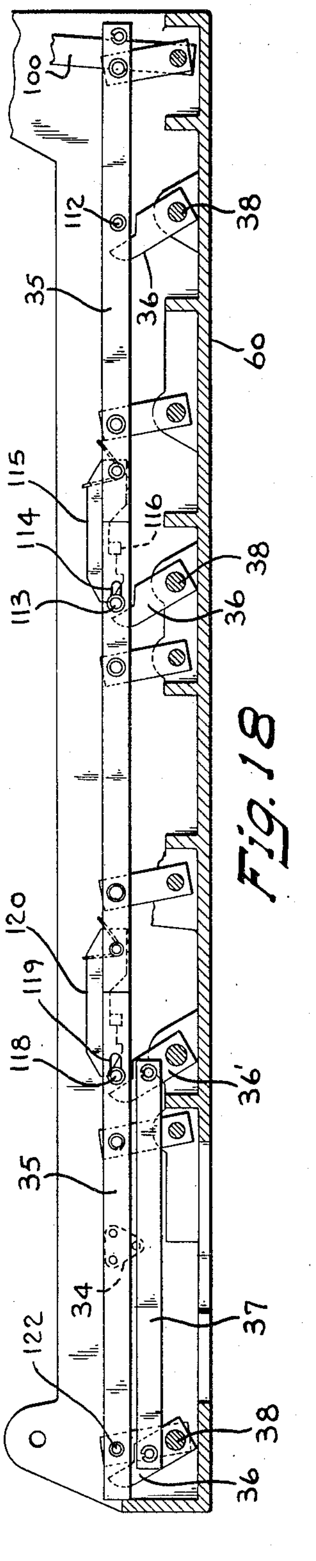

Figure 18 is a view showing the trip bar when none of the series coils is energized.

Figure 19:
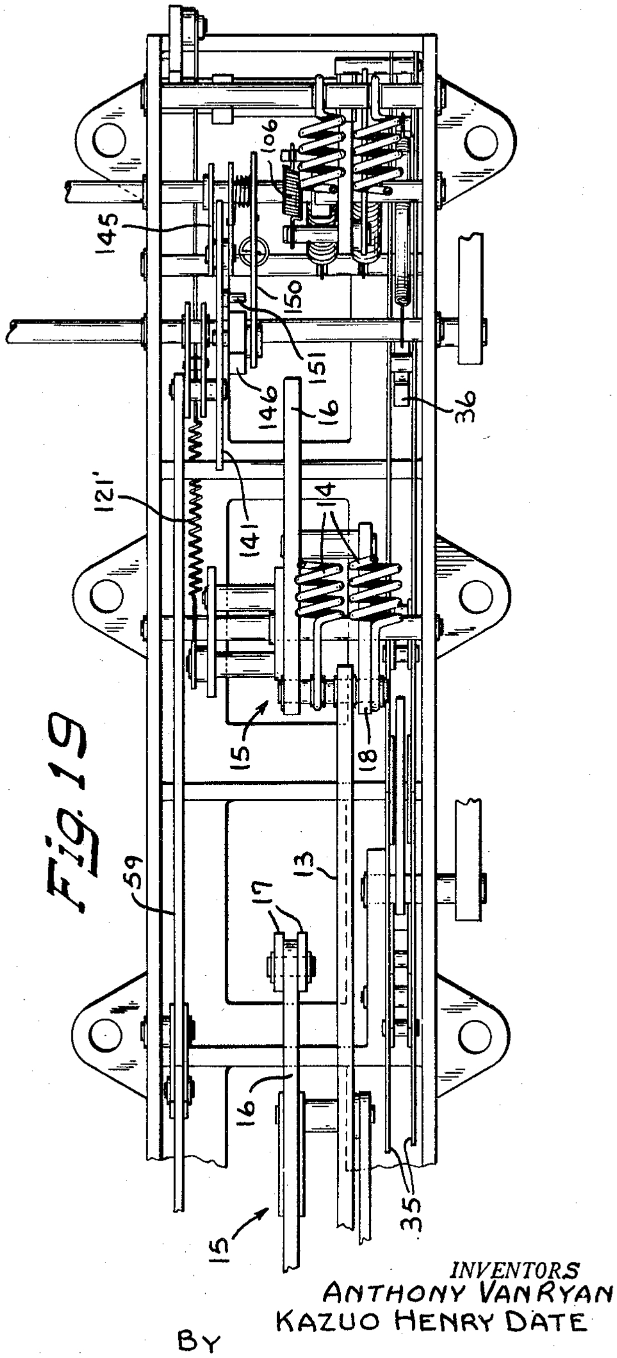

Figure 19 is a plan view of the front end of the chassis, and other associated parts.

Figures 20, 21, 22, 23:
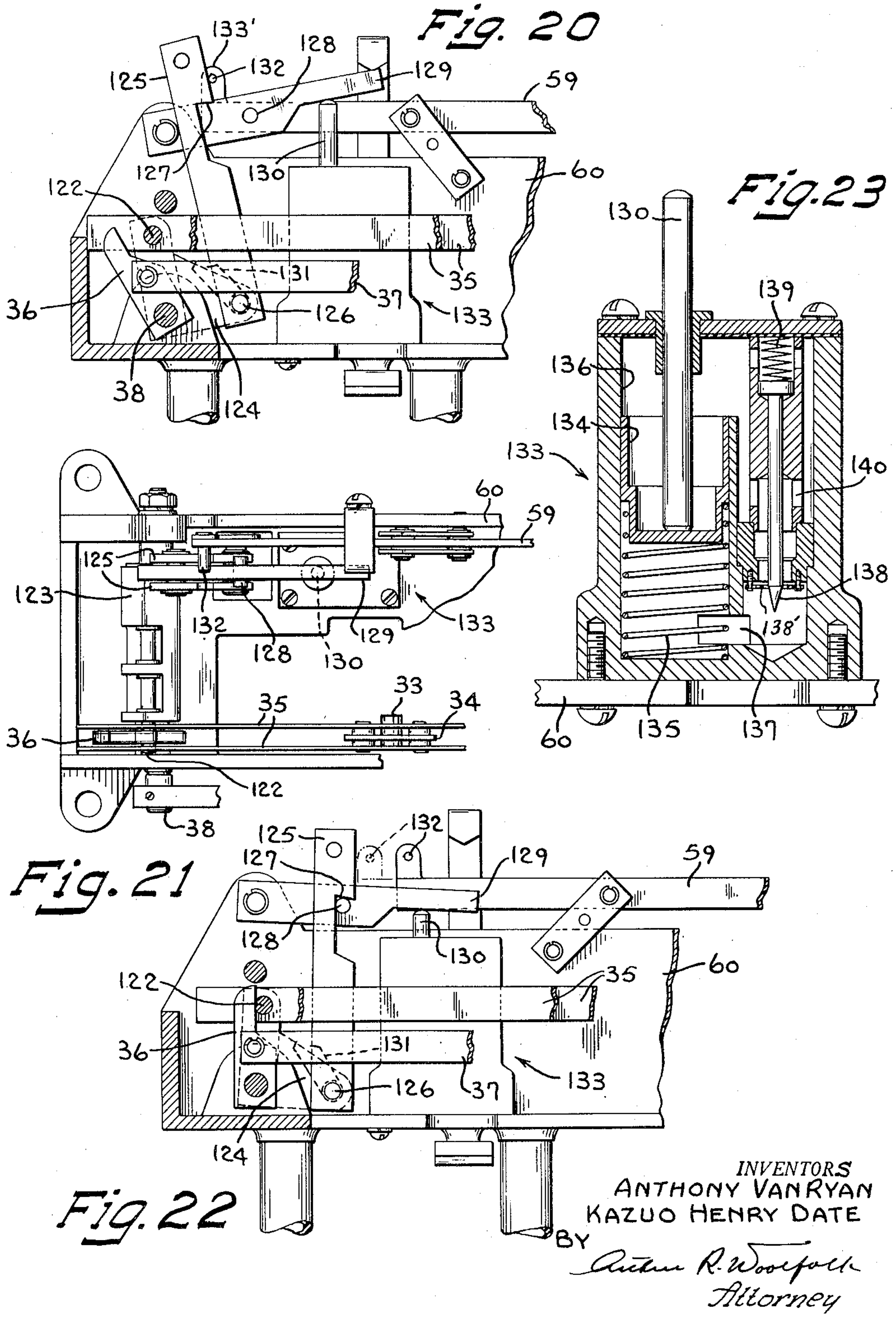

Figure 20 is a view of the rear portion of the circuit interrupter showing the time delay mechanism, such view showing the parts in position before the time delay is brought into action.

Figure 21 is a plan view of the structure shown in Figure 20.

Figure 22 is a view corresponding to Figure 20 showing the position of the parts when the time delay has been brought into action.

Figure 23 is a sectional view through the time delay means.

Figure 24:
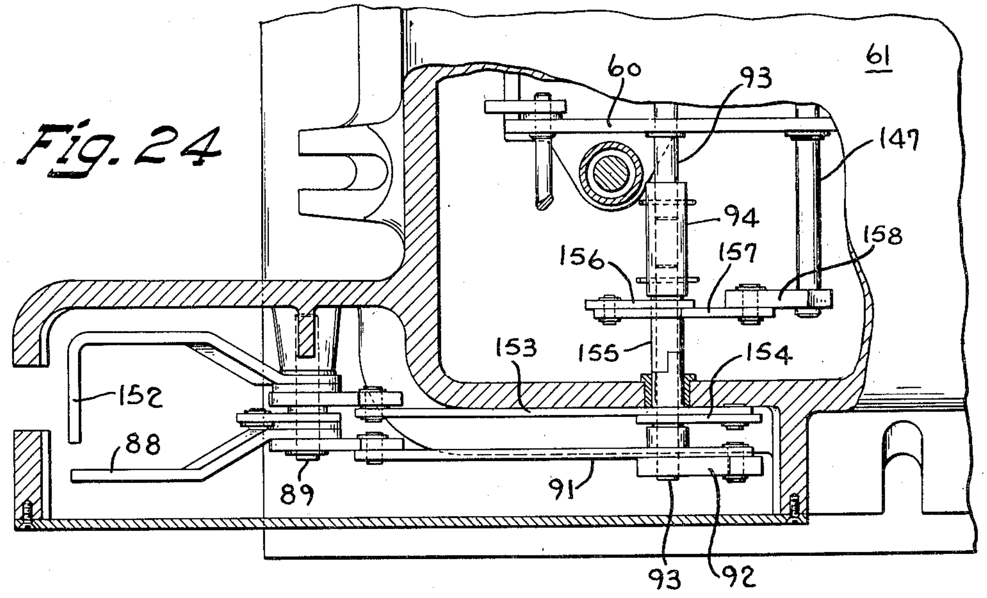

Figure 24 is a fragmentary sectional view of the front end of the circuit interrupter showing the trip handle and the single shot handle.

Figure 25:
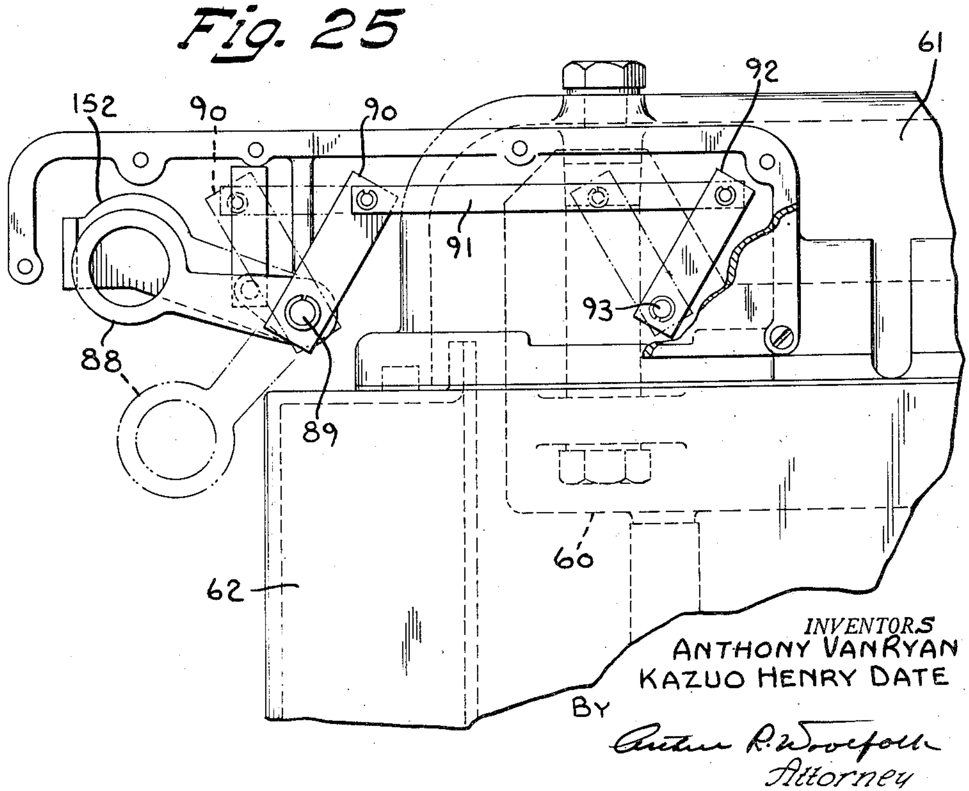

Figure 25 is a side elevation with parts removed showing the structure illustrated in Figure 24, showing the parts in normal position in full lines and showing the reset hand lever in lockout position in dotted lines.

Figures 26, 27:
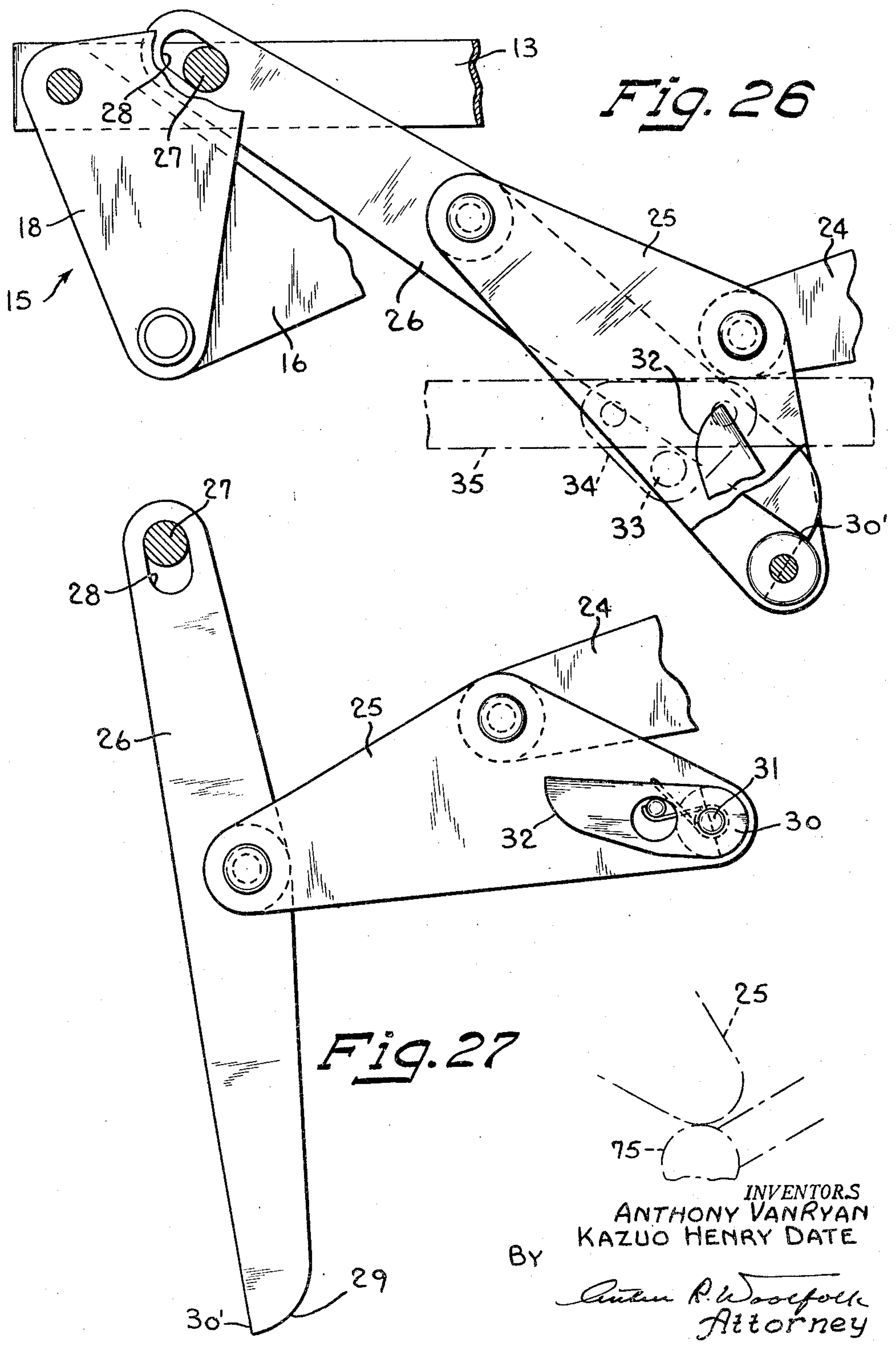

Figure 26 is a view showing the main latch for latching the toggle mechanism which normally connects the main power bar with the resetting plunger.

Figure 27 is a view similar to Figure 26 showing the toggle link broken, or in other words showing the main latch tripped and in a position it occupies only instantaneously before the magnet plunger has risen.

Figure 28:
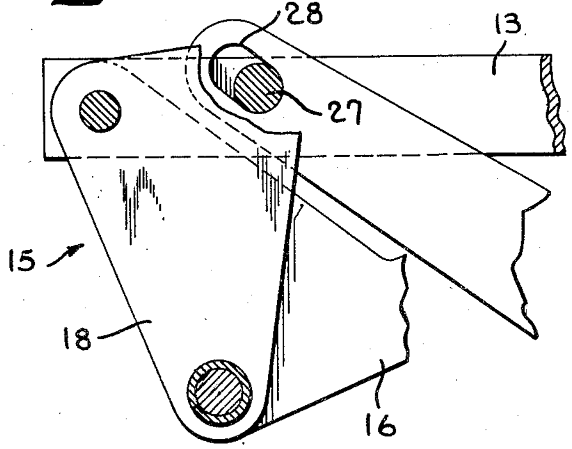

Figure 28 shows how the rear end of the toggle link is connected to the rear switch lever and thus to the power bar.

Figure 29:
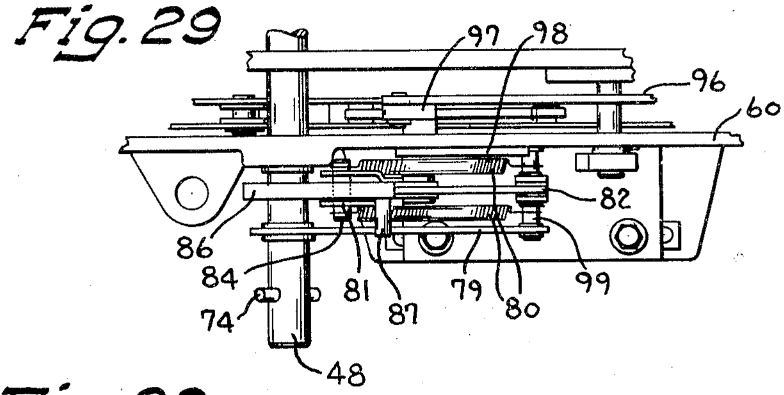

Figure 29 is a plan view of the overcenter switch mechanism for controlling the resetting solenoid.

Figure 30:
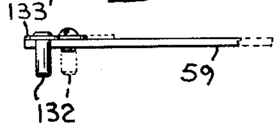

Figure 30 is a plan view of the rear end of the sequence bar showing in full lines the position of the bracket for a minimum number of delaying operations and showing in dotted lines the position of the bracket for a greater number of delayed operations.

Figure 31:
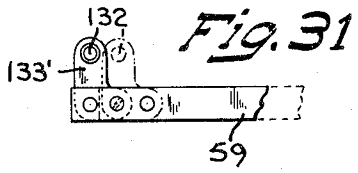

Figure 31 is a side elevation of the structure shown in Figure 30.

Figure 32:
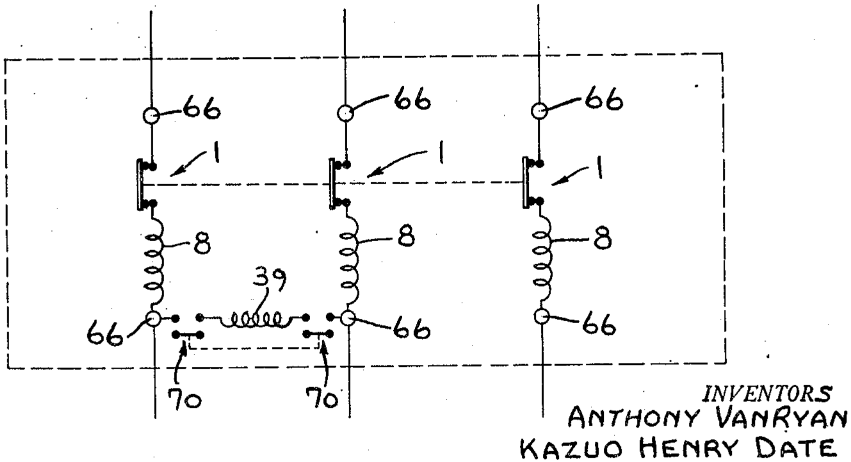

Figure 32 is a wiring diagram of the circuit interrupter.

Figure 33:
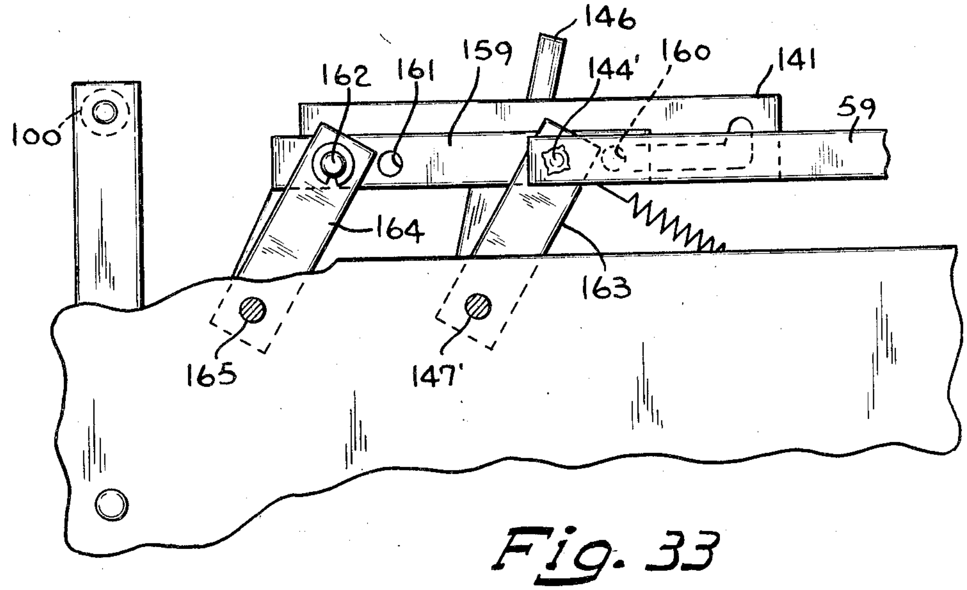

Figure 33 is a fragmentary side elevation of the front end of the device showing a modified form of the invention.

Figure 34:
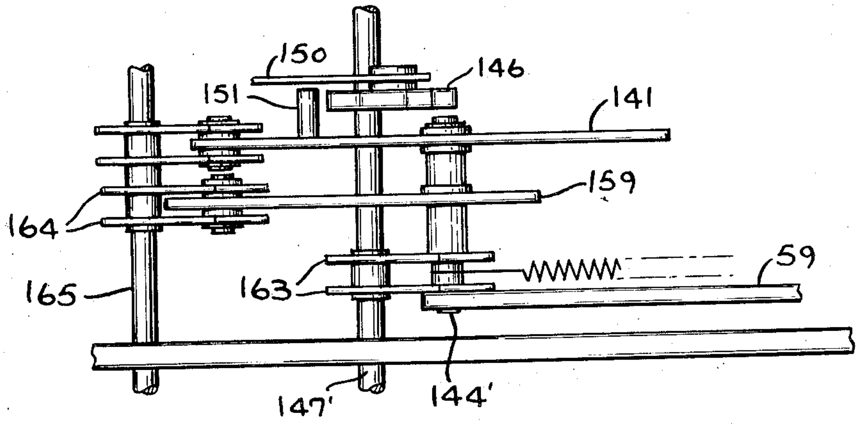

Figure 34 is a plan view of the structure shown in Figure 33.

Figure 1:
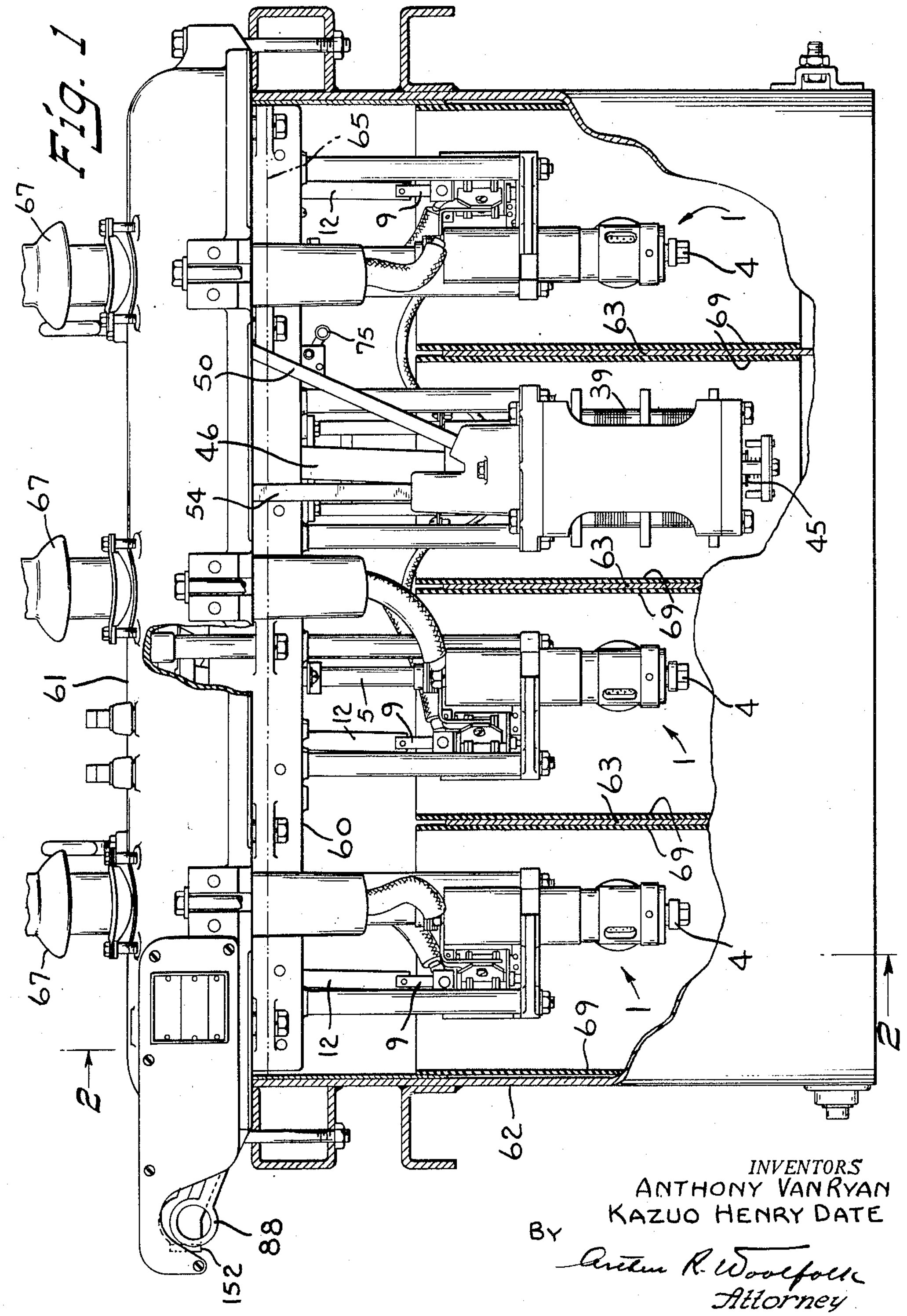
Figure 1 is a view taken from the left-hand side of the circuit interrupter with parts broken away and parts in section.
Figure 2:
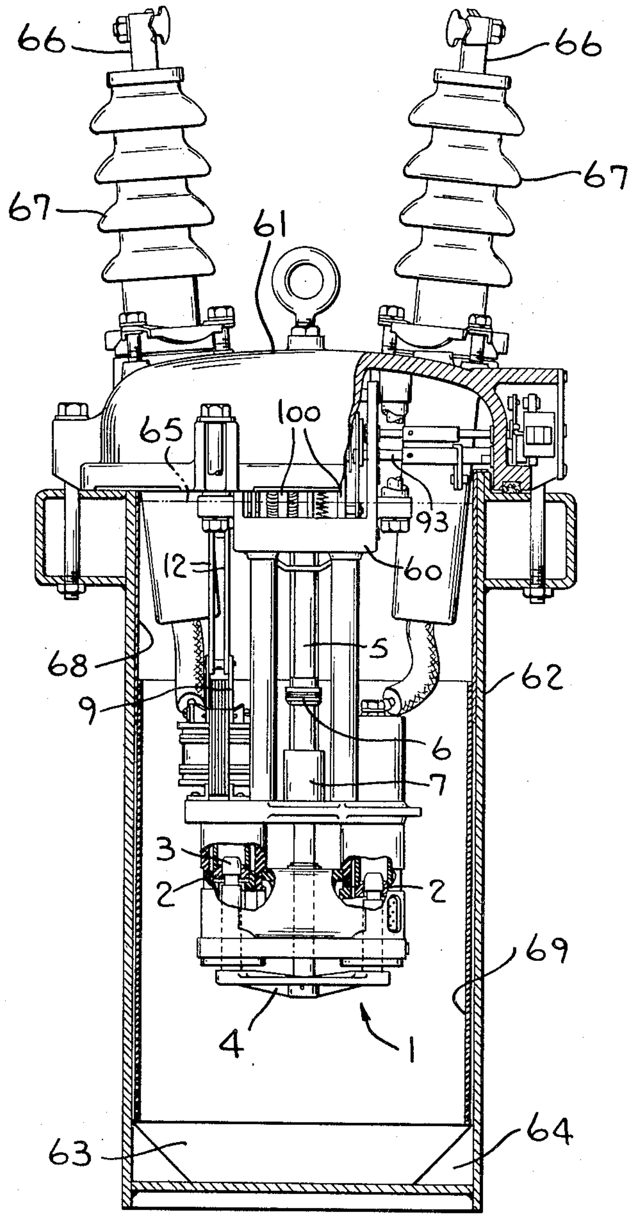
Figure 2 is a sectional view on the line 2—2 of Figure 1.
Figure 3:
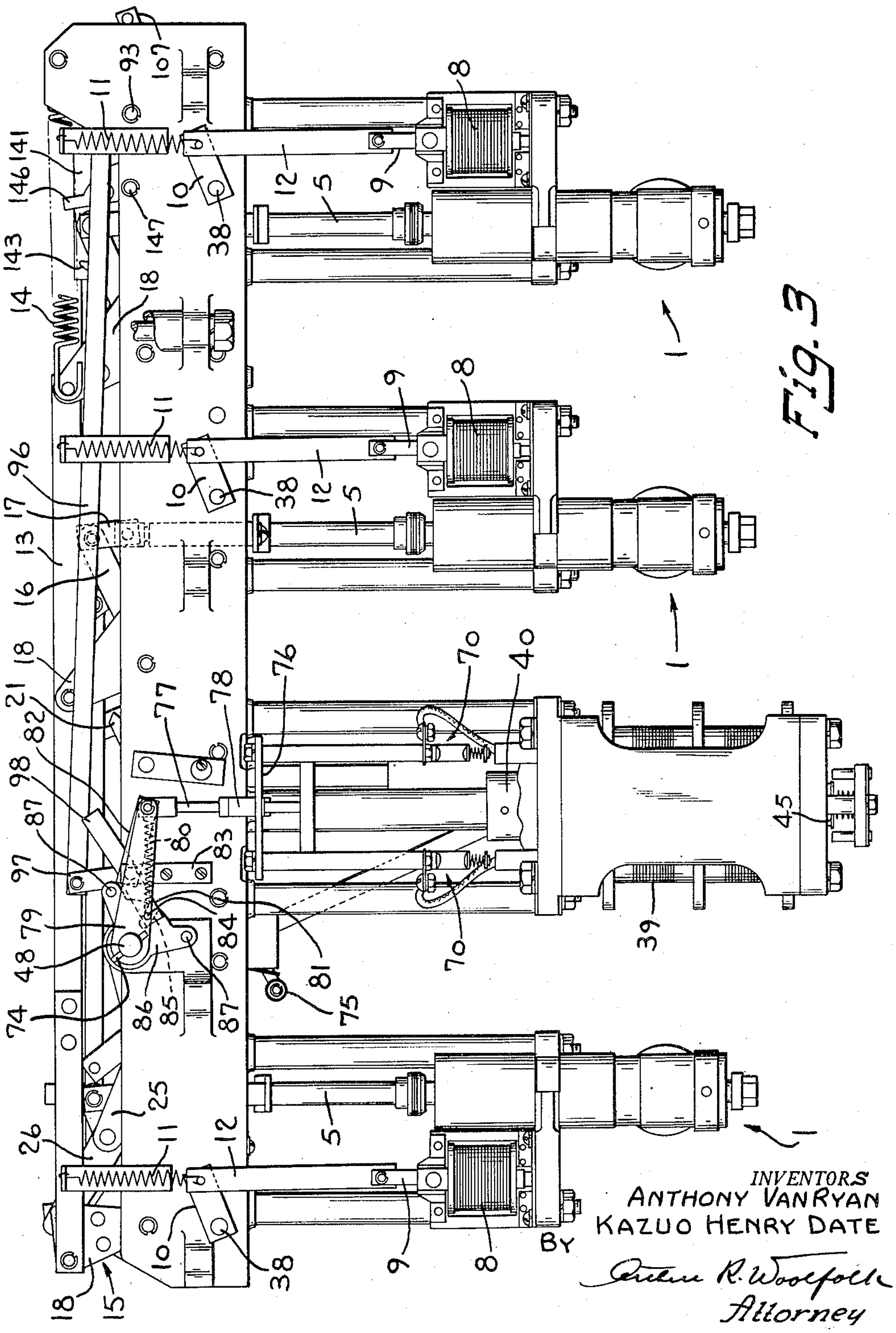
Figure 3 is a right-hand side view of the circuit interrupter removed from the casing and with the cover removed, such view showing the parts in switch closed position.

The polyphase circuit interrupter chosen for illustration is a three phase circuit interrupter which has three contact assemblies indicated generally by the reference character 1, see Figures 1 and 3, which are arranged to simultaneously open upon the occurrence of an overload in any phase or in a plurality of phases. These contact assemblies which comprise a pair of stationary contacts 2 and pair of coacting movable contacts 3 rigidly carried by a conducting crosshead 4, the crosshead in turn being carried by a switch operating rod 5 of insulating material, see Figure 2. If desired, each contact rod may be provided with a piston 6 adapted to enter a dashpot type of cylinder 7 though the specific form of the contacts and associated parts standing alone form no part of this invention.

Each of the contact assemblies is positioned in one of the phases and adjacent each contact assembly is a relatively small series coil 8 connected directly in series with the corresponding phase. Each series coil or solenoid 8 is arranged to draw a magnetic plunger 9 downwardly into the coil upon energization of the coil upon overload. The upper end of the plunger 9 of each series coil is connected to a rock lever 10 and to a spring 11 by means of an insulating link 12.

The series coils are not called upon to operate the contacts but are merely called upon to release a power rod 13 which is heavily biased towards switch open position by means of spring means 14 which may if desired, and as shown in the drawings, be made of a plurality of heavy springs acting in parallel. However, for the sake of simplicity either the term "spring" or "spring means" will be employed to indicate either one or a plurality of springs.

Figure 10:
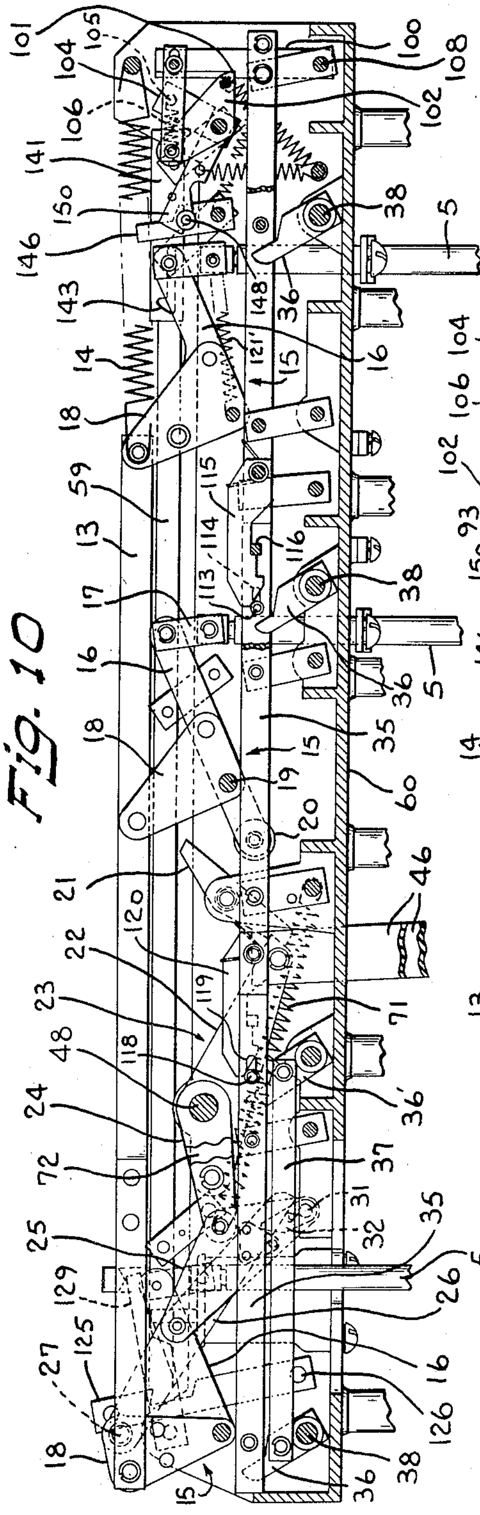
Figure 10 is a side elevation of the power bar or main operating bar and the links connected therewith, such view also showing the trip bar. This figure shows the parts in switch closed position, and some parts in section.

The power rod or power bar 13 is biased towards switch open position and is retained in this position by a latch or latch means hereinafter described. The power bar is pivoted to, and supported by, a plurality of bell crank levers indicated generally by the reference character 15, each of which is provided with an arm 16 connected by means of small links 17 with the corresponding switch rod or switch operating rod 5. Each bell crank lever is also provided with an arm 18 which is the arm that is pivotally connected to the power bar 13. The center bell crank lever has its arm 16 extended beyond the pivot point 19 and is provided with a roller 20 adapted to trip a latch 21 when the bell crank levers are released and are rocked by the power spring 14 in a clockwise direction as viewed in Figure 10. The release of the latch 21 occurs during the final rocking motion of the bell crank levers. The latch 21 normally latches the arm 22 of a switch resetting bell crank lever indicated generally at 23 in switch closed position as shown in Figure 10. The other arm of the switch closing bell crank lever 23 is indicated by the reference character 24 and is connected with the rearmost bell crank lever 15 by toggle link mechanism composed of the floating link 25 and the link 26 which is pivoted as indicated at 27 to the rearmost bell crank lever 15 by lost motion mechanism, see Figures 26 and 27. This lost motion mechanism may consist of a slot 28 formed in the link 26 coacting with the pin 27 carried by the arm 18 of the rearmost of the bell crank levers 15, see Figures 26, 27 and 28.

The construction of the toggle link mechanism 25 and 26 is best shown in Figures 26 and 27. It is to be noted that normally the toggle link mechanism 25 and 26 is locked against collapsing as the lever 26 is provided with a rounded end 29 having a face 30′ which is normally latched against the half solid portion of a semicylindrical latch member 30, see Figure 26 and which is released when the latch member 30 is rocked in a clockwise direction to thus release the lever 26. The half cylindrical latch 30 is carried by means of a shaft 31 to which is rigidly attached a trip finger 32 adapted to be tripped by means of a pin 33 carried by a trip bar 35. As a matter of fact, the pin 33 is carried by means of a lug 34 secured to the trip bar 35. The trip bar 35 is operated when the plunger 9 of any one of the series solenoids 8 is drawn downwardly, see Figure 3.

It will be noted that the plungers 9 operate cranks or levers 10, rigidly attached to the shafts 38, see Figure 3. These shafts 38 extend inwardly of the chassis and are provided with levers or fingers 36, see Figure 10, located inwardly of the chassis which are adapted to operate the trip bar 35 in a manner which will be explained hereinafter. It is to be noted that the rearmost finger 36 is connected, by means of an intermediate link 37, with an idler finger 36′, see Figure 10.

It is to be borne in mind that the description as thus far given has developed the main bar or power bar 13 and the trip bar 35. This trip bar merely serves to trip the latch 30 by means of the engagement of the pin 33 with the trip finger 32, see Figure 26, which thus allows the toggle 25, 26 to break, the toggle being overcenter when in locked position and being heavily biased towards breaking motion by means of the power spring 14 acting through the power bar 13. The power bar 13 is thus held in switch closed position under normal conditions and is released when any one of the series coils 8, see Figure 3, is energized. Upon release of the power bar 13, each of the bell crank levers 15 is rocked in a clockwise direction and thrusts the switch rods 5 downwardly thus quickly opening the switches. As stated previously, and as will now be seen, the energy which will simultaneously open all three of the switches is not furnished by the series coils but is furnished by means of the power springs 14.

Figure 4:
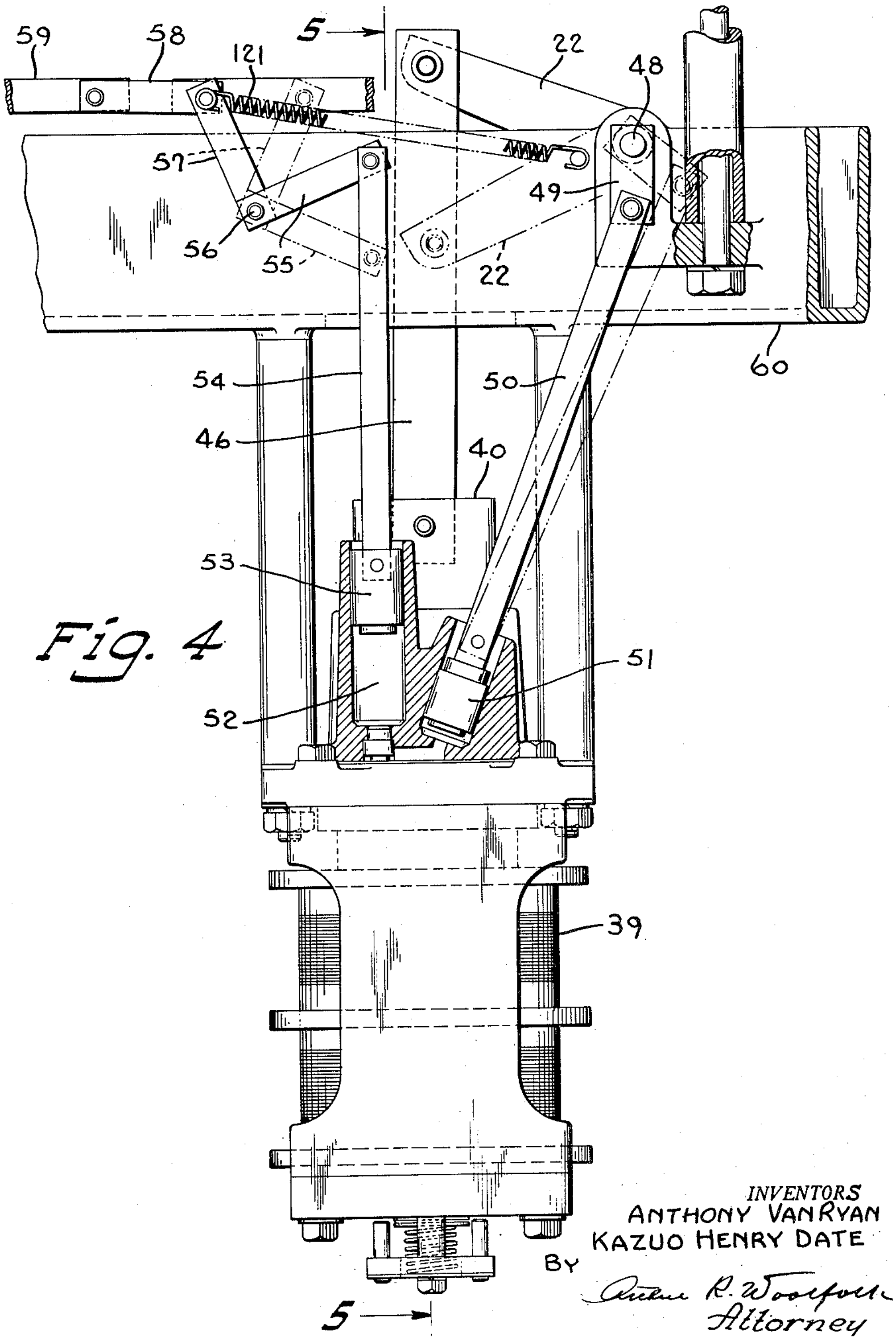
Figure 4 is a view partly in section showing the counting, integrating, or cumulative pump mechanism.
Figure 5:
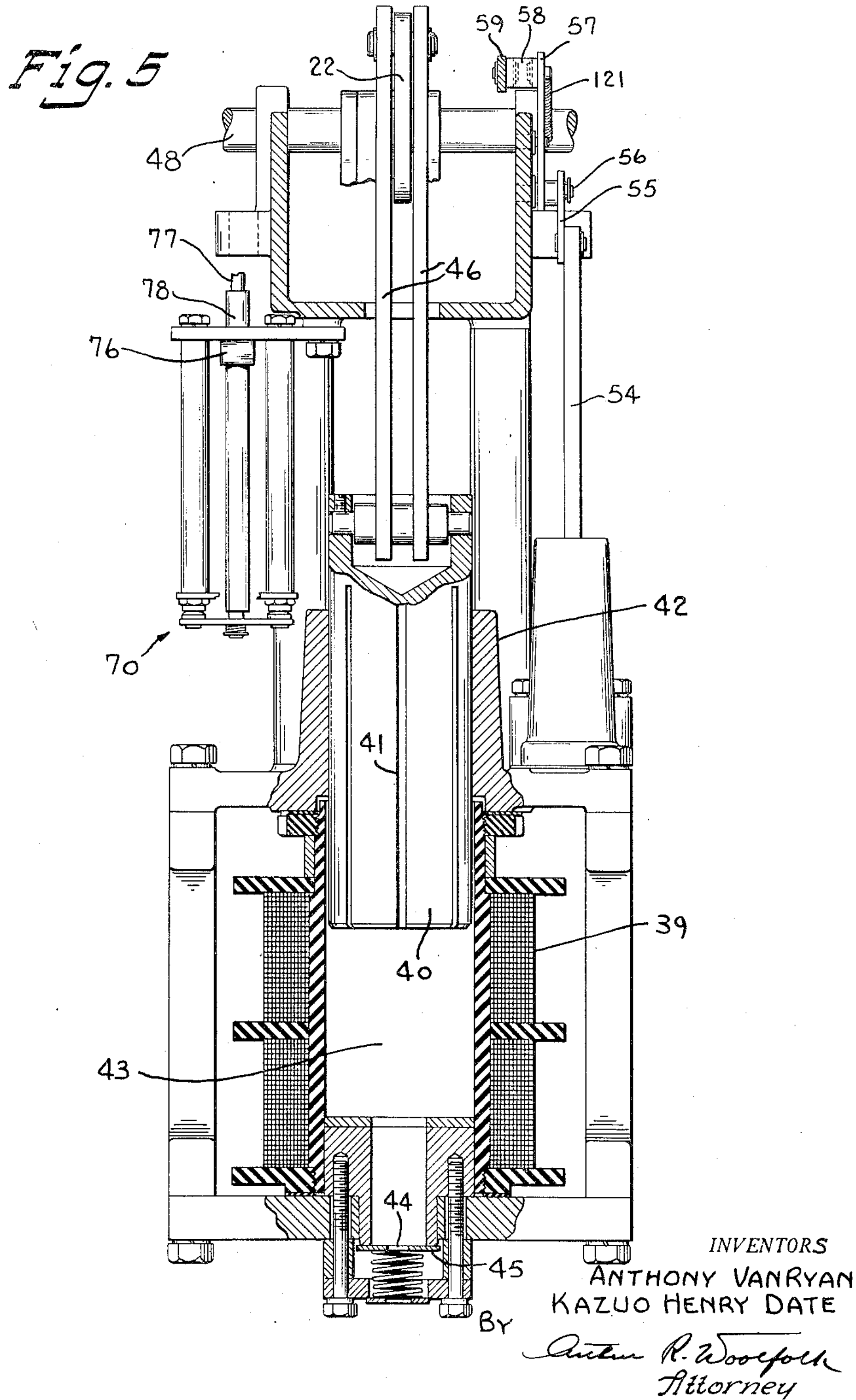
Figure 5 is a sectional view on the line 5—5 of Figure 4.

The means for storing energy in the power springs consists of what may be called a power solenoid or potential solenoid or coil 39, see Figures 4 and 5, which is arranged to draw its magnetic plunger 40 downwardly upon temporary energization of the resetting power coil 39. The magnet plunger 40 of the resetting or switch closing electromagnet and the magnetic plungers 9 of the series electromagnets or overload electromagnets have their magnetic circuits completed in any of the usual ways, as by means of their surrounding magnetic frames as shown in Figures 3 and 5. The power or resetting plunger 40 may be slotted as indicated at 41 and the slots are so related to the guide collar 42, See Figure 5, through which the resetting or switch closing plunger slides, as to provide communication of the dashpot cylinder 43 below the plunger 40 with the outside when the plunger arrives at a point adjacent the uppermost part of its stroke to thus provide a quick finish for the upstroke of the plunger. The initial portion or major portion of the upstroke of the plunger is retarded as the oil is trapped beneath the plunger and has to be supplied through a small orifice 44 in a light check valve 45 which is spring pressed upwardly and normally substantially closes the lower portion of the cylinder 43. The check valve 45 freely opens downwardly and the plunger 40 has a non-retarded, free downward stroke and thus serves to quickly close all of the main switches. Its upstroke, however, is retarded and this provides the time delay before the circuit interrupter is closed after an opening operation.

The magnetic plunger 40 is connected by means of a pair of insulating links 46, see Figures 4 and 5, with the lever or arm 22 rigid with a shaft 48 which shaft also rigidly carries a small arm or lever 49 connected by means of a link 50 with a pumping piston 51 whose downward pumping stroke is arranged to pump a measured quantity of oil into the cumulative or counting cylinder 52 of the counting piston 53, suitable valves being provided in the pumping piston 51 and at the bottom of the cylinder 52 of the counting piston 53 in the usual manner. This counting piston 53 is connected by means of a link 54 with a lever 55 rigid with a shaft 56 which is also rigid with a lever 57 connected by means of a small link 58 with the sequence bar or lockout bar 59 hereinafter described. Preferably the links 50 and 54 are of insulating material. All of the shafts hereinabove described, and all of the mechanism, in fact, is carried by the chassis or main body portion 60 of the circuit interrupter.

From reference to Figures 1 and 2, it will be seen that the chassis or main body portion 60 is supported from a top or cover 61 which in turn is bolted to a tank 62. The tank is provided with a plurality of partitions 63 which have cut-away lower corners 64 to provide free circulation of oil which latter is carried within the tank and extends to approximately the oil level indicated by the reference character 65 in Figure 2. No attempt has been made to show all of the electrical connections of the incoming and outgoing leads. However, suffice it to say that one series coil and one contact assembly is connected in series in each phase and each phase is connected through the terminals 66 which extend outwardly from the top or cover 61 through insulating bushings 67 whose lower ends project downwardly below the oil level. It is to be noted that the upper portion of the tank is lined with a fiber sheet 68 and the inner walls of each separate compartment in which the switch assemblies and series coils are individually positioned are lined with a fiber sheet 69.

Attention is directed to Figure 32 showing the wiring diagram. The lower terminals 66 are the input terminals and the upper terminals are the output terminals. All of the remaining portions shown in the wiring diagram have been described hereinabove with the exception of the auxiliary switch indicated by the reference character 70 which auxiliary switch is the potential or reset coil switch and controls the energization of the large reset coil 39 of the resetting electromagnet. The circuit of the reset coil is normally open and is only closed for a very brief instant sufficient for a quick or substantially instantaneous closing of the main switches 1. Therefore, it is apparent that the reset coil 39 will not add much heat to the body of oil carried within the circuit interrupter and may even be overloaded, if desired without danger to the coil. Further, the small series coils 8 have very low resistance and add very little heat to the body of oil carried within the circuit interrupter. Thus it is apparent that one of the difficulties in a large number of circuit interrupters as heretofore constructed has been avoided by the construction outlined hereinabove.

It is believed that a brief description of the operation of the apparatus as thus far described will aid in the understanding of the invention.

When an overload occurs one of the series coils is energized and operates the trip bar 35, which as will be understood, is permanently operatively connected to the pin 33, see Figure 26, so that when the trip bar is moved to the right, as viewed in such figure, it rocks the trip finger 32 to the right and thus rotates the semicylindrical latch 30 and releases the link 26 of the toggle link 25, 26. The heavy power springs 14 connected to the forward end of the power bar or switch opening bar 13 draw the bar 13 forwardly or to the right as viewed in Figures 10 and 26 and opens all the main switches with a quick motion since the sole restraining means for the power bar 13 is the toggle link mechanism 25, 26 and its latch 30 which directly hold the rearmost of the bell crank levers 15, and thus hold all of the bell crank levers 15, see Figures 10 and 26, in switch closed position. The toggle link mechanism 25, 26, see Figures 26 and 27, passes from its latched position, shown in Figure 26, through its unlatched position shown in Figure 27, which latter position is only momentarily occupied as will be apparent as the description proceeds. It is apparent that all of the bell crank levers 15 simultaneously rock in a clockwise direction when released as viewed in Figure 10 and the roller 20 carried by the intermediate bell crank lever 15 will trip the magnetic plunger-restraining latch 21. This allows the magnetic plunger lever 22 to rock upwardly and consequently allows the magnetic plunger 40 to rise to its uppermost position under the influence of the spring 71, see Figure 10, attached at one end to a lever 72 rigid with the lever 22 and directly back of the lever 24 and attached at the other end to a stationary point on the apparatus. The levers 22, 24 and 72 are rigidly attached to a main rock shaft 48 so that the rock shaft 48 is rocked by the magnetic plunger on the one hand when the magnetic plunger is drawn into the resetting magnet coil 39, and on the other hand in which the rock shaft 48 is rocked by the spring 71 in a counterclockwise direction, see Figure 10.

It is to be noted that the main rock shaft 48 projects laterally of the chassis 60 and is provided with pins 74, see Figure 29. This projecting portion of the rock shaft is adapted to be engaged by any suitable manually operable means so that it may be rocked in the shop when the circuit interrupter is disconected from all sources of power. Under normal conditions, the energy for resetting the circuit interrupter and storing energy in the power spring 14 is furnished by the resetting electromagnet when its plunger 40 is drawn downwardly into the coil 39.

It is to be noted from Figure 3 that a small spring pressed roller 75 is pivotally supported from the chassis. The purpose of this roller is to provide means adapted to be engaged by the lower end of the lever 25, see Figure 27, when the lever is nearing its final locked position as shown in imaginary lines in such figure. This causes the lever 25 to have a snap action just before the lever 26 rocks into position as shown in Figure 26 and thus insures locking of the lever 26.

The coil 39 of the electromagnet which retracts or draws the magnetic plunger 40 downwardly is controlled by means of a small switch indicated generally by the reference character 70 as previously described in connection with the wiring diagram, Figure 32. This switch is provided with a crosshead 76 which is operated by means of a rod 77 slidably guided in a sleeve 78. The rod 77 is connected to a lever 79, see Figure 3, which is loosely mounted on the main rock shaft 48 and operated by an overcenter spring 80. One end of this spring is operatively connected to a link 81 which is pivoted to a second link 82, and the other end is operatively connected to the link 82. The two links 81 and 82 constitute a toggle link mechanism and are carried at their center on a small bracket 83, see Figure 3. It is to be noted from Figure 29 that a pair of springs constitute the spring or spring means 80. The lever 81 of the small toggle link 81, 82, see Figure 29, is forked and carries a pin 84. The pin 84 fits within a notch 85 formed in a rocking member 86 rigid with the main rock shaft 48. The rocking member 86 is provided with a pair of pins 87 spaced apart and located on opposite sides of the operating overcenter spring lever 79 for the auxiliary switch, 70, as may be seen from Figures 3 and 29.

It is obvious from the immediately preceding description that when one end of the toggle link mechanism 81, 82 is rocked upwardly due to the counterclockwise rotation of the main rock shaft 48, that the spring 80 will be carried overcenter by means of the rocking member 86 and will cause the auxiliary switch 70 to snap closed thus closing the circuit of the resetting electromagnet and causing resetting of the circuit interrupter. In the event that the operating lever 79, see Figures 3 and 29, should stick for any reason whatsoever one or the other of the pins 87 carried by the rocking member 86 rigid with the shaft 48 will start or push the lever 79 overcenter and the spring 80 will complete the stroke of such lever.

At the front end of the circuit interrupter a manual resetting and trip lever 88 is loosely pivoted to the cover on a shaft as indicated at 89, see Figures 11, 12, 14, 15, 24 and 25. The position of the pivot point 89 is moved inwardly in the broken away views of Figures 11, 12, 14 and 15, its correct position being shown in Figures 24 and 25. This manual resetting and trip lever 88 is rigid with a small lever 90 which lever is connected by means of a link 91 with a lever 92 rigid with the trip shaft and resetting shaft 93, see Figures 24 and 25. In reality the trip shaft and resetting shaft 93 is made in two parts for the purpose of ease in assembly and is joined by a sleeve 94, see Figure 24. However, this construction is of no interest in the operation of the apparatus. The trip shaft and resetting shaft 93 rigidly carries a small lever 95 which is connected by means of a link 96, see Figures 3, 15 and 29, which is connected at its rear end to a lever 97 rigid with a lockout lever 98 for holding the auxiliary switch of the magnet coil open. This auxiliary switch lockout lever is shown in Figures 3 and 29 and is adapted to be rocked downwardly against the pin 99 carried by the operating lever 79 of the reset magnet switch or auxiliary switch. It is very clear that when the lockout and reset shaft 93 rocks to lockout position by a downward pull on the manual reset and lockout or trip lever 88, see Figure 25, that the auxiliary switch 70 will be prevented from closing and consequently the circuit interrupter will be locked out. In reality the main switches in the three phases are not locked open, but instead the auxiliary switch, which closes the electromagnet circuit for the reset magnet, is locked in open position and thus the circuit interrupter is locked open.

At the front end of the circuit interrupter, see Figures 10 and 11, there is pivotally mounted a lockout lever 100. This lockout lever is provided with a latching shoulder 101 against which a spring pressed lockout latch 102 normally bears. This lockout latch or lever 102 is urged towards lockout position as indicated in Figure 11 by means of a spring 103. It is normally prevented from moving to lockout position as its lower end is seated against the shoulder 101 of the lockout lever 100 as shown in Figure 10.

The lockout shaft 93 also carries a small lever 104 which is provided with a pin 105 and is connected to the upper end of the latch lever 102 by means of a spring 106. When the lockout shaft or trip shaft 93 is rotated in a clockwise direction as viewed in Figures 10 and 11, the pin 105 will strike the lockout lever 100 and rock it to the position shown in Figure 11 thus releasing the latch 102. The latch 102, since it is spring urged in a clockwise direction by the spring 103, will rock the lockout lever 100 to the position shown in Figure 11 as it is connected thereto by means of a link 107. The link 107 has a loose connection with the lockout lever 100 as is apparent from an examination of Figure 11. The lockout lever 100 is provided with a pair of arms which are rigidly joined by means of a shaft 108, see Figure 13. The lockout lever 100 is in reality therefore a double arm lever but will be referred to as merely one lever. It is urged towards latching position with reference to the latch 102 by means of the small spring 109, see Figure 13. However, the spring 103 of the latch 102 overpowers the small spring 109 when the latch 102 is released, see Figure 11. When the lockout lever 100 rocks to lockout position it engages a pin 110 carried by the trip bar 35, see Figures 11, 12 and 13, and rocks the trip bar forwardly or to the right as viewed in Figures 11 and 12 thus causing tripping of the bell crank levers indicated generally at 15 and causing opening of the circuit interrupter. It is to be noted that a spring 111 urges the trip bar 35 to the left as viewed in Figure 11 but this spring is relatively light and is overpowered by the spring 103 when manual tripping or automatic tripping at lockout, hereinafter described, occurs.

A brief description of the operations of the circuit interrupter as thus far described will be given herewith.

Assuming that all of the main switches are closed and that an overload occurs, the trip bar will be tripped through the medium of one or more of the overload series coils 8 and plungers 9 which rock the corresponding rock shaft 38 and thus actuates the trip bar through means hereinafter described. The trip bar 35 will be moved to the right as viewed in Figures 10 and 26 and will cause the pin 33, see Figure 26, to strike the release finger 32 and thus allow the toggle composed of links 26 and 25 to break. The parts rock through the position shown in Figure 27 and allow the main power bar or rod 13 to move forwardly or to the right as viewed in Figures 10, 11 and 12 under the influence of the power springs 14. This simultaneously rocks all of the bell crank levers 15 and simultaneously opens the switches in the three phases with a very quick motion. At the latter part of the motion, the roller 20, see Figure 10, carried by the middle bell crank lever 15 rocks upwardly and releases the latch 21 allowing the magnetic plunger 40 to rise. This causes counterclockwise rotation of the levers 22, 24 and 72 under the influence of the spring 71 for raising the electromagnet plunger 40, see Figure 10. The plunger thus rises and the lever 24 rocks downwardly, as viewed in Figures 10, 26 and 27. The toggle link mechanism as stated hereinabove passes through the position shown in Figure 27 and rocks back into locked position with the end 30′ of the link 26 latched against the latch 30. Continued upward motion of the magnet plunger 40 causes the overcenter spring 80, see Figures 3 and 29 to rock upwardly past deadcenter thus closing the auxiliary switch 70 of the magnet coil 39 and energizing the magnet. It is to be noted that the slot 28 of the link 26 allows lost motion between the pin 27 of the rearmost bell crank lever 15 and such link and thus allows the magnetic plunger to rise beyond the point where the toggle link 25, 26 latches to thereby insure closing of the auxiliary switch only after the toggle link has locked. The electromagnet descends and rocks the lever 24 back to the position shown in Figure 26, and rocks the spring 80, see Figure 3, downwardly over deadcenter and thus opens the auxiliary switch 70 with a quick motion just before the end of the downstroke of the magnetic plunger 40. During the closing motion, the pump piston 51, see Figure 4, executes a pumping stroke and pumps oil into the cylinder 52 of the counting piston 53 thus advancing the sequence bar 59 one step in its step-by-step manner.

The means for rocking the trip bar 35 comprise as stated the small levers 36. The lever 36 at the front end of the circuit interrupter, see Figures 15 and 18, is advanced to engage a pin 112 carried directly by the trip bar 35, see Figures 15, 16 and 18. The next lever 36 for the next adjacent or middle series coil is arranged to engage a pin 113 which is slidable in a slot 114 in the articulated trip bar 35. This trip bar, it will be seen, is composed of sections, as shown in Figures 15 and 16 for instance. Figure 15 shows how the lever 36 of the middle series coil engages the pin 113 and lifts the spring pressed latch 115 carried by the front end of the trip bar 35 from engagement with the transverse pin or bar 116 of the intermediate section of the trip bar 35. In the event, for example, that the forward series coil has been simultaneously energized as shown in Figure 16 no force will be transmitted to the trip bar 35 by means of such forward series coil since the forward section of the trip bar 35 has been detached from intermediate section and consequently the middle series coil alone will be effective in the event both the middle and forward coils are energized simultaneously. The same is true of the last lever 36 energized by the rearmost coils 8. This lever is adapted to engage a pin 122 carried by the rear end of the trip bar 35 as shown in Figure 18. In addition to this, the rearmost lever 36 is connected to an intermediate lever 36′ by means of the link 37 and the auxiliary lever 36′ is arranged to engage a slidable pin 118 carried in a slot 119 in the trip bar 35 and is thus arranged to raise the latch 120 so that if either or both the central and the forward coils are energized, the force from such coils will not be transmitted to the trip bar 35.

It will be seen therefore that only one series coil at a time is effective to operate the trip bar 35. The purpose of this construction is to prevent the time delay, hereinafter described, from being doubly or triply overloaded by the multiple operation of the series overload coils. The time delay means opposes only one trip or overload magnet at a time thereby securing greater accuracy in calibration.

The sequence bar 59 is urged rearwardly by means of a spring 121, see Figure 4, which may be attached at any point along the sequence bar 59 at one end and to a stationary portion of the apparatus at the other, and by means of a spring 121′ attached at one end to one of the levers supporting the sequence bar and at the other end to the chassis, see Figures 6, 7, 11, and 19. The sequence bar is thus moved towards the front end of the circuit interrupter in a suitable step-by-step manner against the action of the springs 121, 121′. When overloads occur with sufficiently short intervals between them the action of advancing the sequence bar by the counting piston 53 will be cumulative. However, if overloads are widely spaced in time, the counting piston 53 will gradually settle back to its original position and will thus allow the sequence bar to move back to its original position.

The pin 122 adjacent the extreme rear end of the trip bar, see Figures 18, 21 and 22, extends into the upper end of a rocking lever 123 which is pivotally carried by the chassis and which extends across the rear end of the chassis. The lever 123 is provided with an outwardly extending arm 124, see Figures 20 and 22, to which is pivoted a shouldered link 125 as indicated at 126. The link 125 is provided with a shoulder 127 normally held out of engagement with a pin 128 carried by a depressible lever 129 of a time delay device, such lever being adapted to engage and depress the stem 130 of the time delay device, see Figures 20, 21, 22 and 23. The lever or link 125 is spring pressed in a clockwise direction by means of a small spring 131, see Figure 20. It is held out of engagement with the pin 128 of the time delay lever 129 by means of a pin 132 carried by a bracket 133′, see Figure 20, adjustably mounted on the sequence bar 59, the adjustability of the bracket on the sequence bar being illustrated in Figures 30 and 31. The position of the bracket determines the relative number of fast and slow shots of the circuit interrupter but does not alter the total number of shots. As long as the link 125 is not delayed in its downward motion, see Figure 20, the operation of the circuit interrupter is substantially instantaneous on overload. When the downward motion of the link 125 is delayed by the time delay means hereinabove described, a delayed response to overload is obtained. This provides two time current characteristics.

The time delay device is so constructed that the delay is not only inversely proportional to the magnitude of the overload but this inverse relation is increased as the overload increases. In other words, there is a shorter time delay the heavier the overload and this shortening of the time delay is over and beyond a direct proportion to the overload but automatically decreases in length of time out of proportion to the increase in the magnitude of the overload. This result is produced by the construction shown in Figure 23. In Figure 23 the time delay device is indicated generally by the reference character 133 and comprises a piston 134 which is spring pressed upwardly as indicated at 135 and is located in a cylinder 136. The oil under pressure below the piston 134, when the piston is being depressed, escapes through the orifice 137 and passes the needle valve 138. The needle valve is spring pressed downwardly as indicated at 139 and the return apertures for the oil passing the needle valve are indicated at 140. It will be seen from the construction shown in Figure 23 that as pressure on the lower end of the needle valve 138 increases the spring 139 will be compressed more and more. This allows a larger and larger opening to occur at the needle valve and consequently allows a greater and greater flow of oil past the needle valve and thus produces less and less delay by the time delay device out of proportion and beyond that produced normally by increasing overloads. In other words, the inverse relation is automatically increased. If desired, the member 138' in which the needle valve escape orifice is formed, may be loosely mounted to act as a valve to provide a quick upstroke for the piston.

Figure 6:
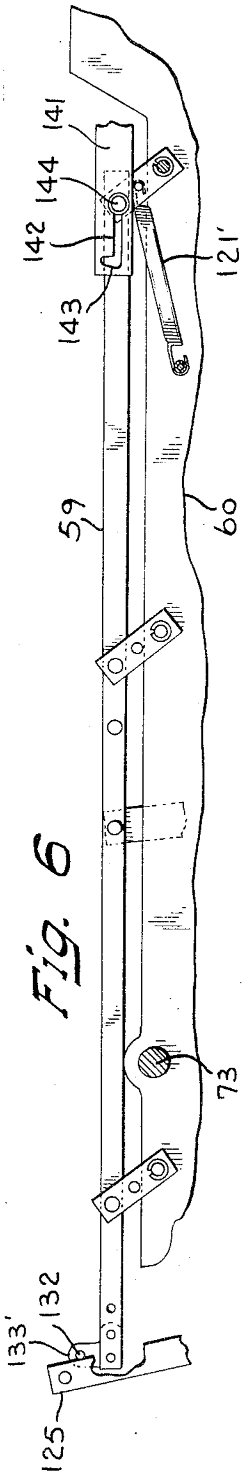
Figure 6 is a side elevation showing the sequence bar or lockout bar.
Figure 7:
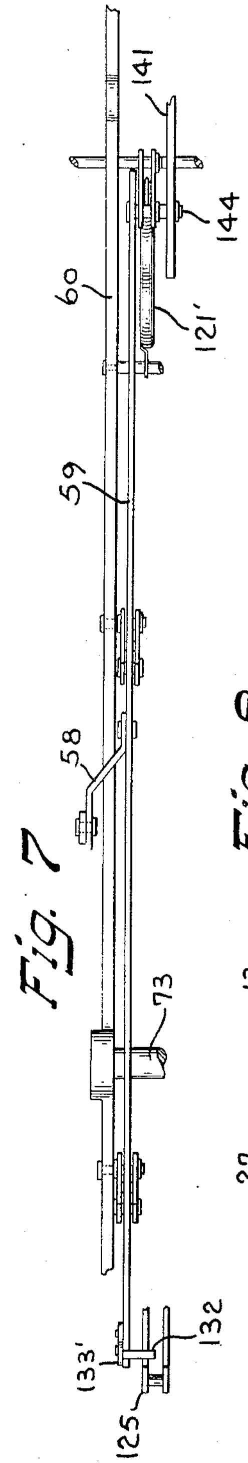
Figure 7 is a plan view of the sequence bar or lockout bar.
Figure 8:
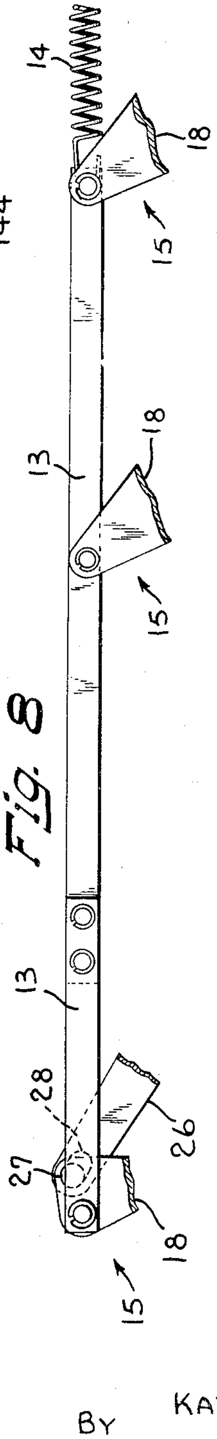
Figure 8 is a side elevation of the power bar or main operating bar.
Figure 9:
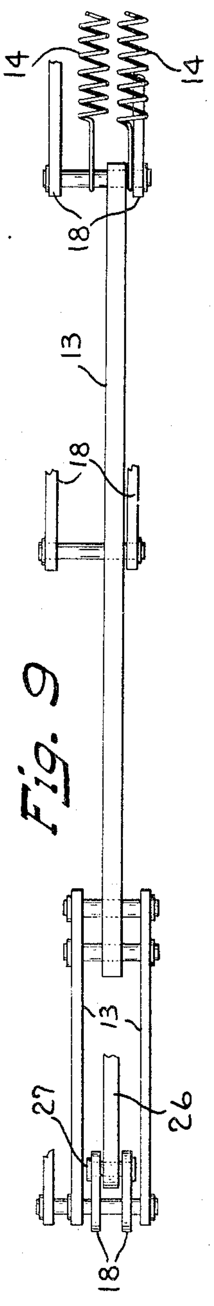
Figure 9 is a plan view of the power bar or main operating bar.

The sequence bar or lockout bar 59 is adapted when fully advanced to rock the lockout lever 100 when the full number of operations for which the device is designed have occurred in rapid succession. However, the circuit interrupter may be set for a one-shot operation by externally manipulable means. As shown in Figures 6, 7, 10, 11, 12, 14 and 19, the sequence bar includes a movable extension 141 which is provided with a slot 142 having an upwardly extending recess 143 at its rear end. This recess is adapted to receive the pin 144 carried by the sequence bar or lockout bar 59. Normally, the pin 144 rests in the forward end of the slot 142 as shown in Figures 6, 7, and 12, as the lever 145 which supports the forward end of the extension 141 is spring pressed in a counterclockwise direction as shown in Figure 19. However, the link 141 may be rocked forwardly towards the lockout bar 100 by means of a lever 146 rigidly carried by a shaft 147, see Figures 12 and 14, and provided with a roller 148 adapted to selectively seat in any one of a plurality of notches 149 formed in a spring pressed latch 150. When the lever 146 is advanced to the right as viewed in Figure 14 it engages a pin 151 on the link 141, see Figures 12, 14 and 19 and moves the link forwardly until the pin 144 on the sequence bar 59 engages the notch 143.

The rocking of the shaft 147 is controlled by means of a single shot lockout handle 152, see Figure 24 which is connected by a link 153 to a lever 154 carried by a sleeve 155 loose on the shaft 93. The sleeve 155 is provided with a lever 156 connected by means of a link 157 with a lever 158 rigid with the shaft 147.

When the single shot lockout lever 152 is operated the extension link 141, see Figure 12, is moved into close proximity to the lockout bar 100 so that at the first operation of the sequence bar 59 lockout occurs.

It is clear that if desired the sequence bar may be extended or shortened so as to lessen or increase the total number of sequential operations before lockout occurs.

It will be seen that in affect the extension 141 is operatively a part of the sequence bar 59.

In the modified form of the invention shown in Figures 33 and 34 an additional bar 159 has been illustrated as constituting, in effect, a rigid extension of the sequence bar 59. The bar 159 is provided with a plurality of holes 160 adajacent its rear end and a plurality of holes 161 adjacent its forward end. These holes are adapted to receive a pin 144' on the sequence bar 59 and a pin 162. The pin 144' is carried by a lever 163 and the pin 162 is carried by a lever 164. The lever 163 is closely pivoted on the shaft 147' which corresponds to the shaft 147 of Figure 12 and the lever 164 is loosely carried by a shaft 165 which replaces the shaft 93 of Figure 12. The shafts 147' and 165 are connected by suitable levers and links to the single shot lever 152 and the reset and trip lever 88 of Figures 24 and 25.

It is obvious that the single shot adaptability is retained in the modified form of the invention shown in Figures 33 and 34. However, the extra bar 159 is, in effect, an extension of the sequence bar 59 and it may be provided with any number of holes desired indicated at 160 and 161 in Figure 33 so as to extend or shorten the sequence bar to thus lessen or increase the total number of operations before lockout occurs, for rapid sequential operations.

It will be seen that a novel form of polyphase circuit interrupter has been provided which is so made that it may be used as a repeating circuit interrupter having two time current characteristics or may be used as a single shot circuit interrupter. It will be seen further that the circuit interrupter may be instantly changed from a multiple shot interrupter to a single shot interrupter or vice versa by externally manipulable means.

Further it is to be noted that this invention provides a polyphase circuit interrupter which is so made that the time the time delay means can never be subjected to the force exerted by more than one of the tripping electromagnets.

It is to be noted also that the relative number of fast and slow operations may be adjusted as desired. Also if desired, the circuit interrupter may be adjusted to have any desired total number of sequential operations.

A further feature of this invention is the novel form of time delay device which is so made that its time delay period is inversely as the load but in which this inverse relation is automatically increased as the load increases.

Although this invention has been described in considerable detail, it is to be understood that such description is intended as illustrative rather than limiting, as the inventions may be variously embodied and is to be interpreted as claimed.

We claim:

1. A repeating polyphase circuit interrupter comprising a plurality of main switches including a main switch for each phase, spring means biasing said main switches towards open position, a resetting electromagnet having an armature normally mechanically connected to said main switches for closing said main switches and resetting said spring means, latch means for normally holding said main switches closed and for disconnecting said armature from said main switches and from said spring means when released, a plurality of overload electromagnets for tripping said latch means, and a second latch means for holding the armature of said resetting electromagnet in switch-closed position, said second latch means being tripped by the opening motion of said main switches.

2. A repeating polyphase circuit interrupter comprising a plurality of main switches including a main switch for each phase, spring means biasing said main switches towards open position, a resetting electromagnet having an armature normally mechanically connected to said main switches for closing said main switches and resetting said spring means, latch means for normally holding said main switches closed and for disconnecting said armature from said main switches and from said spring means when released, a plurality of overload electromagnets for tripping said latch means, and a second latch means for holding the armature of said electromagnet in retracted position, said second latch means being tripped by the opening motion of said main switches, and an automatically mechanically opearted switch for closing the circuit of said electromagnet upon opening of said main switches.

3. A repeating polyphase circuit interrupter comprising a plurality of main switches including a main switch for each phase, power spring means biasing said main switches towards open position, a single resetting electromotive means normally connected to said main switches and said power spring means for closing said main switches and storing power in said power spring means, a first latch normally mechanically connecting said resetting means and said main switches and said power spring means, a second latch normally holding said resetting means against motion, overload responsive means for tripping said first latch, said power spring means coacting with said first latch to relatch said first latch after said main switches have opened; and means for releasing said second latch after said first latch has been relatched.

4. A repeating polyphase circuit interrupter comprising a plurality of main switches including a main switch for each phase, power spring means biasing said main switches towards open position, a single resetting electromagnet including a coil and an armature normally connected to said main switches and said power spring means for closing said main switches and storing power in said power spring means when said armature is retracted, a first latch normally mechanically connecting said armature and said main switches and power spring means, a second latch normally holding said armature in retracted position, a second spring means urging said armature towards projected position, overload responsive means for tripping said first latch means, said power spring means coacting with said first latch to relatch said first latch after said main switches have opened, time delay means for delaying the projection of said armature from said coil, and means for releasing said second latch after said first latch has been relatched.

5. A repeating polyphase circuit interrupter comprising a plurality of main switches including a main switch for each phase, power spring means biasing said main switches towards open position, a single resetting electromagnet including a coil, and an armature normally connected to said main switches and said power spring means for closing said main switches and storing power in said power spring means when said armature is retracted, a first latch normally mechanically connecting said armature and said main switches and power spring means, a second latch normally holding said armature in retracted position, a second spring means urging said armature towards projected position, overload responsive means for tripping said first latch means, said power spring means coacting with said first latch to relatch said first latch after said main switches have opened, time delay means for delaying the projection of said armature from said coil, means for releasing said second latch after said first latch has been relatched, a second tripping means for tripping said first latch, lockout means for operating said second tripping means, and counting means controlling the operation of said lockout means.

6. A repeating polyphase circuit interrupter comprising a plurality of main switches including a main switch for each phase, power spring means biasing said main switches towards open position, a single resetting electromagnet including a coil and an armature normally connected to said main switches and said power spring means for closing said main switches and storing power in said power spring means when said armature is retracted, a first latch normally mechanically connecting said armature and said main switches and power spring means, a second latch normally holding said armature in retracted position, a second spring means urging said armature towards projected position, overload responsive means for tripping said first latch means, said power spring means coacting with said first latch to relatch said first latch after said main switches have opened, time delay means for delaying the projection of said armature from said coil, means for releasing said second latch after said first latch has been relatched, a second tripping means for tripping said first latch, lockout means for operating said second tripping means, counting means controlling the operation of said lockout means, and a second time delay means under the control of said cumulative means for delaying the operation of said overload responsive means.

7. A repeating polyphase circuit interrupter comprising a plurality of main switches, spring means biasing said main switches towards open position, a latch normally holding said main switches closed, a trip bar formed of a plurality of separable sections normally operatively connected together for tripping said latch, a single time delay means for delaying the tripping of said latch, and a plurality of overload electromagnets for actuating said trip bar against the action of said time delay means and for separating said trip bar into segments to cause only one overload electromagnet at a time to operate upon said time delay means.

8. A repeating polyphase circuit interrupter comprising a plurality of main switches, spring means biasing said main switches towards open position, a latch normally holding said main switches closed, a trip bar formed of a plurality of separable sections normally operatively connected together for tripping said latch, a single time delay means for delaying the tripping of said latch, a plurality of overload electromagnets for actuating said trip bar against the action of said time delay means and for separating said trip bar into segments to cause only one overload electromagnet at a time to operate upon said time delay means, and power means for automatically resetting said circuit interrupter.

9. A repeating polyphase circuit interrupter comprising a plurality of main switches, spring means biasing said main switches towards open position, a latch normally holding said main switches closed, a trip bar formed of a plurality of separable sections normally operatively connected together for tripping said latch, a single time delay means for delaying the tripping of said latch, a plurality of overload electromagnets for actuating said trip bar against the action of said time delay means and for separating said trip bar into segments to cause only one overload electromagnet at a time to operate upon said time delay means, electromotive means for closing said main switches and storing energy in said spring means and an auxiliary switch controlling said electromotive means and operatively connected to said main switches and arranged to close after said main switches have opened.

10. A repeating polyphase circuit interrupter comprising a plurality of main switches, spring means biasing said main switches towards open position, a latch normally holding said main switches closed, a trip bar formed of a plurality of separable sections normally operatively connected together for tripping said latch, a single time delay means for delaying the tripping of said latch, a plurality of overload electromagnets for actuating said trip bar against the action of said time delay means and for separating said trip bar into segments to cause only one overload electromagnet at a time to operate upon said time delay means, electromotive means for closing said main switches and storing energy in said spring means, a normally open auxiliary switch controlling said electromotive means and operatively connected to said main switches and arranged to close when said main switches have opened, lockout means, cumulative means for operating said lockout means after a plurality of operations of said circuit interrupter occurring in rapid sequence, and means operated by said lockout means for holding said auxiliary switch open when said lockout means has operated.

11. A repeating polyphase circuit interrupter comprising a plurality of main switches, spring means biasing said main switches towards open position, a latch normally holding said main switches closed, a trip bar formed of a plurality of separable sections normally operatively connected together for tripping said latch, a single time delay means for delaying the tripping of said latch, a plurality of overload electromagnets for actuating said trip bar against the action of said time delay means and for separating said trip bar into segments to cause only one overload electromagnet at a time to operate upon said time delay means, electromotive means for closing said main switches and storing energy in said spring means, a normally open auxiliary switch controlling said electromotive means and operatively connected to said main switches and arranged to close when said main switches have opened, lockout means normally occupying an initial position and movable to lockout position, cumulative means for moving said lockout means to lockout position after a plurality of operations of said circuit interrupter have occurred in rapid sequence, means operated by said lockout means for holding said auxiliary switch open when said lockout means is in lockout position, and manual means for moving said lockout means from lockout position to its initial position.

12. A repeating circuit interrupter comprising main switch means, spring means for opening said main switch means, electromotive means for closing said switch means and storing energy in said spring means, a latch for holding said switch means closed, overload means for tripping said latch, an auxiliary switch operated from said main switch means for causing energization of said electromotive means after each time that said main switch means has operated up to lockout, lockout means controlling said auxiliary switch and holding said auxiliary switch open when said lockout means has been moved to lockout position, cumulative means including a sequence bar for moving said lockout means to lockout position after a plurality of operations of said circuit interrupter occurring in rapid sequence, means for resetting said lockout means, and means for extending the effective length of said sequence bar to cause operation of said circuit interrupter, whereby lockout occurs for a lesser number of operations of said circuit interrupter.

13. A polyphase circuit interrupter comprising a plurality of main switches, power spring means biasing said main switches towards open position, electromotive means for closing said main switches and storing energy in said power spring means, a latch for holding said main switches closed, a trip bar for tripping said latch, a plurality of overload electromagnets for actuating said trip bar, a normally open auxiliary switch controlling said elctromotive means and closed each time up to lockout by the opening motion of said main switches, lockout means for holding said auxiliary switch open when moved from an initial position to lockout position, cumulative means for moving said lockout means to lockout position after a plurality of operations of said circuit interrupter occurring in rapid sequence, means connecting said lockout means with said latch to trip said latch when said lockout means is moved to lockout position, and manual trip means and reset means for selectively moving said lockout means to lockout position or to its initial position.

14. A housed repeating circuit interrupter comprising a housing, an operative assembly located within said housing and including switch means, switch opening means including overload responsive means, lockout means for preventing operation of said switch means, cumulative means for operating said lockout means after a plurality of operations of said circuit interrupter occurring in rapid succession, manual trip and reset means including an operating member located externally of said housing and operatively connected to said lockout means, and single or plural shot means including an operating member located externally of said housing and operatively connected to said cumulative means for selectively causing operation of said lockout means by said cumulative means after a single or a plurality of operations of said circuit interrupter.

References Cited in the file of this patent

UNITED STATES PATENTS

| | | |
|---|---|---|
| 758,020 | Robinson | Apr. 19, 1904 |
| 1,429,528 | Payne | Sept. 19, 1922 |
| 1,522,187 | Huber | Jan. 6, 1925 |
| 1,741,824 | Burnham | Dec . 31, 1929 |
| 1,837,805 | Ainsworth | Dec. 22, 1931 |
| 2,145,140 | Starr | Jan. 24, 1939 |
| 2,246,298 | Dyer et al. | June 17, 1941 |
| 2,476,076 | Walle et al. | July 12, 1949 |
| 2,483,602 | Wallace et al. | Oct. 4, 1949 |
| 2,567,411 | Van Ryan | Sept. 11, 1951 |
| 2,593,225 | Van Ryan et al. | Apr. 15, 1952 |